Jan. 28, 1969  B. D. HALPERN ET AL  3,423,829
TOOTH STRUCTURE INCLUDING MEANS FOR CHEMICALLY
BONDING DIVERSE MATERIALS TOGETHER
Filed Aug. 20, 1965

INVENTORS
B. DAVID HALPERN
JOHN O. SEMMELMAN

BY  *Sherman & Shalloway*
ATTORNEYS

United States Patent Office 3,423,829
Patented Jan. 28, 1969

3,423,829
TOOTH STRUCTURE INCLUDING MEANS FOR CHEMICALLY BONDING DIVERSE MATERIALS TOGETHER
Benjamin David Halpern, Jenkintown, and John O. Semmelman, York, Pa., assignors to The Dentists' Supply Company of New York, York, Pa., a corporation of New York
Filed Aug. 20, 1965, Ser. No. 481,191
U.S. Cl. 32—8
Int. Cl. A61c *13/08, 13/10;* C07f *7/02*
25 Claims

ABSTRACT OF THE DISCLOSURE

An artificial tooth which comprises an outer shell of esthetic procelain and an inner core selected from reinforcing strong porcelain, synthetic resin, and a combination of synthetic resin and reinforcing strong porcelain. The various portions of the artificial tooth are bonded to each other and the artificial tooth itself is bonded to a resinous denture base through a strong chemical union between the procelain portions of the tooth and the resin portion of the tooth or denture base along their broad areas of contact by a polymerized organic silicon compound. The artificial tooth therefore combines the esthetic and mechanical characteristics of porcelain plus a means of readily bonding the artificial tooth to a resinous denture base.

---

This invention relates generally to an artificial tooth product and more particularly to an improved artificial porcelain tooth structure.

It has been the practice in the dental art for many years to attach porcelain anterior teeth to a denture base by means of conventional metal pins. In order to avoid the use of these pins suitable other and alternate means have been devised in the past wherein an undercut diatoric or a dovetail shaped porcelain retention surface cut into the materials to be joined is used as a means to lock the artificial teeth to the prosthetic base. Generally the pin anchorage type of fastener provides a stronger and better retention than the diatoric porcelain design. It has proved to be particularly desirable when attaching small and medium sized teeth. There are, however, certain inherent shortcomings attendant even when using the best of these retentive devices and designs. This is particularly true in those situations wherein space in the oral cavity ordinarily occupied by the pin anchorage means is minimized. Such is also true with respect to those cases involving the so-called "close bite" prosthetic appliances in which the natural lower and incisor teeth close so tightly under the overhanging artificial upper teeth that inadequate space is available for a normal or full upper tooth form. Other very similar cases also arise when the gum is so closely underlaid with a bony ridge that a protruding pin or knot of porcelain cannot be accommodated therein.

In order to reduce or, in some cases, virtually eliminate the space occupied by the protruding pin and knots of porcelain forming part of the attachment means, negative and undercut anchorage devices and designs have been sought as a means for reinforcement of the union between the tooth structure and the denture base material. These efforts have, however, as yet not led to a satisfactory solution to this problem inasmuch as the proposed new modes of attachment, although perhaps possessing the necessary strength, also incur the attendant disadvantage of either enlarging the tooth structure, or else result in protruding beyond the same, thus again occupying sorely needed space.

It has also been proposed to produce artificial porcelain teeth comprising a hollow shell of porcelain and a resinous insert therefor similar to the denture base material to which the artificial tooth is to be bonded. Although such an arrangement has yielded an adequate bond between the resinous insert and the denture base material, such teeth have generally failed due to a lack of adequate bonding strength between the porcelain shell and the resinous insert. Again, such an arrangement has not provided adequate strength to avoid breaking and failure under normal service conditions such as masticating of food, biting on a pipe stem, etc.

To overcome the lack of bonding strength between the porcelain shell and resinous insert of these composite teeth, the prior art has attempted to place a pin anchorage across the adjoining surfaces of these two layers. The use of such pin anchorage or bond, however, possesses the same inherent disadvantages as the conventional pin anchorage of a porcelain tooth to a resin denture base material. That is, the pin anchorage necessitates the formation of a larger tooth product lacking esthetic value and having particular disadvantages in situations wherein space in the oral cavity is minimized.

Similarly, it has been proposed to buttress the conventional porcelain artificial tooth with an insert of a stronger type of porcelain. These porcelains, which give great strength to the artificial teeth, are extremely opaque and normally cannot be used for artificial teeth which have an esthetic requirement for translucency and even near-transparency in certain areas. Moreover, the compounded porcelain teeth suffer from the same lack of adequate bonding strength to the resinous denture base material as the conventional porcelain tooth.

It is therefore a primary object of the present invention to produce composite tooth structures having great strength and esthetic values while exhibiting unusually strong bonds to the denture base material.

It is a further object of this invention to produce an artificial tooth product possessing the great abrasive resistance only associated with porcelain teeth and a chemical bonding of the artificial tooth product to the denture base material equal to that associated with artificial plastic teeth.

It is another object of the present invention to produce artificial porcelain tooth products in which the porcelain of such teeth is strongly bonded to a resinous denture base material or resinous insert in a porcelain shell by a reactive silicon-organic chemical bonding agent.

It is a further object of this invention to produce a composite artificial tooth structure comprising a porcelain shell with a resinous insert therefor having a strong chemical bonding agent at the interface between the resinous insert and porcelain shell.

It is yet a further object of this invention to produce an artificial tooth structure in which the exposed surfaces are composed of conventional dental porcelain and the internal or lingual portions consist essentially of reinforcing type porcelains.

It is still a further object of this invention to produce a composite tooth structure in which the exposed surfaces consist of an esthetically desirable dental porcelain underlaid with a layer of a reinforcing porcelain to increase its strength and a plastic core of backing suitable for chemical anchorage of the tooth to the denture resin.

In one embodiment of this invention a hollow porcelain shell is chemically bonded to a plastic core. This core may be the same or similar plastic material as the denture base or any other suitable plastic denture material. This structure has the distinct advantage of having the reactive silicon-organic chemical bonding agent for the bonding of the porcelain shell to the resinous insert on the inner surfaces of the tooth structure. Therefore, such a chemical bonding agent cannot be removed during treatment of the tooth preparatory to its fixed placement in the denture base. The monomer present in the denture base dough, when a mold is packed therewith to form a denture, will have an affinity for the resinous insert or core of the tooth and sufficiently wet the same so that an extremely effective chemical bond is established. A strong physical union of denture base and core is also produced by a physical diffusion of the denture base into the core material.

In another embodiment of this invention, an esthetic porcelain shell is buttressed with a stronger-type reinforcing porcelain insert or core. The ridge lap surface of such a composite tooth is coated with reactive silicon-organic chemical bonding agent to produce a strong chemical bond between the porcelain of the tooth and the denture base material. This composite produces an extremely strong dental product.

In still another embodiment of this invention, an esthetic porcelain shell is buttressed with a reinforcing inner shell of strong porcelain and an inner core of a resinous material of the same or similar composition as the denture base. Such a composite structure results in a tooth which is both strong and adjustable by grinding to fit into different oral cavities without damaging or interfering with the reactive silicon-organic chemical bonding of the inner porcelain shell to the resinous insert or core. Again, the monomer in the denture base dough, when a mold is packed therewith to form a complete denture, will have an affinity for the resinous insert or core of the tooth as well as sufficiently wet the same so that an extremely effective chemical bond and a physical union by diffusion is established.

Other and further objects and advantages of the embodiments of this invention will be pointed out hereinafter in the following more detailed description and by reference to the accompanying drawing in which.

Figure 1:
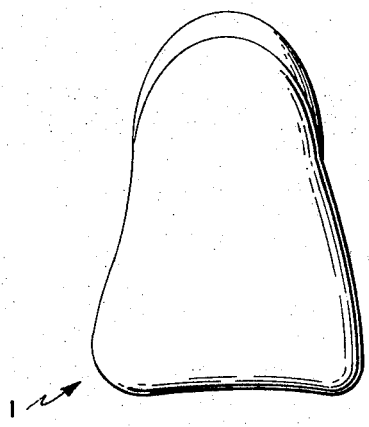
FIG. 1 is a front view of an artificial porcelain tooth embodying the present invention.

Referring to the drawings, numeral 1 of FIG. 1 designates the completed porcelain tooth as viewed from the front.

Figure 2:
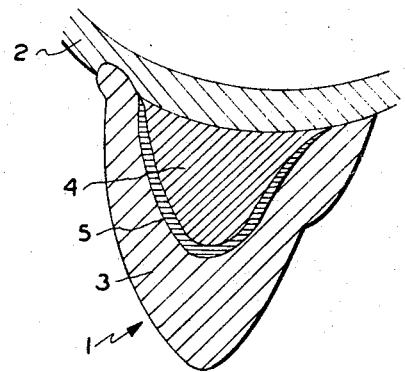
FIG. 2 is a cross sectional side view of one embodiment of the present invention in which an esthetic porcelain shell is combined with a resinous insert or core.
Figure 3:
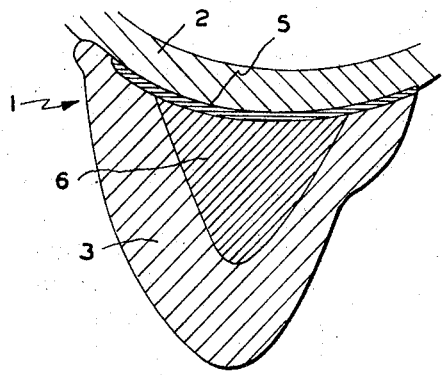
FIG. 3 is a cross sectional side view of another embodiment of the present invention in which an esthetic porcelain shell is buttressed with a strong porcelain insert or core.
Figure 4:
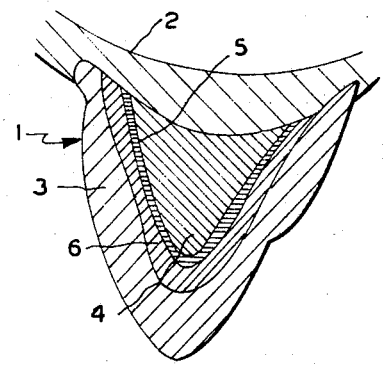
FIG. 4 is a cross sectional side view of a third embodiment of this invention in which an esthetic porcelain outer shell is buttressed with an inner shell of strong porcelain and a resinous insert or core.

In FIG. 2, numeral 2 is the denture base material. This denture base material can be fabricated from any of the conventional acrylate type polymers, such as methyl polymethacrylate, ethyl polymethacrylate, methyl polymethacrylate and combinations of these and other similar conventional denture base materials possessing the necessary structural rigidity and inertness. As examples of other suitable materials, epoxies, polystyrenes, polyesters, and vinyl copolymers such as Luxene, a copolymer of vinyl chloride and vinyl acetate, are enumerated. It is only necessary that such materials contain molecular groups capable of copolymerizing or otherwise reacting with the organic reactive silicon chemical coating 5 whereby an unexpectedly strong chemical bond will be produced. It is to be noted that the chemical coating 5 of FIGS. 2–4 is exaggerated since only a coating of a few molecules thick is employed. It is also within the scope of this invention to employ not only the conventionally heat-cured denture base materials, but also those materials of the auto-curing type. These materials, which are well known in the art, are typified by the usual methacrylate materials wherein the monomer is additionally activated by a suitable accelerator, such as certain types of amine accelerators, similarly well known in the art. Such auto-curing types generally require an additional catalyst such as benzoyl peroxide which is also recognized as useful for this purpose.

The esthetic porcelain shell 3 of FIG. 2, suitable for employment in this invention, is prepared from a porcelain selected from the group consisting of feldspathtic, nepheline syenite, and synthetic porcelains.

It is to be appreciated that the three categories of dental porcelains which are here referred to do, in their inherent characteristics and resistant properties within the meaning of this invention, overlap somewhat, and that there are many similarities between the three which render an exact line of demarcation between them rather difficult. However, insofar as the instant invention be concerned, these and one other nonesthetic type of dental porcelain are defined in the following with the intention that each category does exhibit differentiations which enable classifying them in the manner herein set forth. It is further to be understood that the following definitions do point up what is meant herein as "dental porcelains," as distinguished from the "glasses" known to the art.

The feldspathic porcelains are derived from the naturally occurring mineral orthoclase (potash feldspar,

$$K_2O \cdot Al_2O_3 \cdot 6SiO_2)$$

which is vitrified in sequential steps and forms a glassy phase at about 2050° F. and a crystalline phase (leucite). At about 2350° F. the last trace of the latter crystalline phase is dissolved into the melt and forms a viscous, transparent material capable of sustaining its own shape. Dental porcelains of the feldspathic-type generally contain modifiers such as silica, kaolin and bone ash to produce the needed thermal expansion, strength, opacity and plasticizing characteristics. Some of the dental grade feldspars also contain soda spar or albite and may require preliminary fritting or fusion followed by a grinding operation before being molded into tooth shapes and vitrified.

Nepheline syenite forms the basis for another type of porcelain. Such is actually a naturally occurring mineral. This material is distantly related to the feldspars in that its essential oxides are potassia, soda, alumina and silica. However, its crystalline form is not such that it is capable of fusing to a transparent form-retaining glass from the raw state and it requires prefusing, special grinding and/or dilution with other glass-forming minerals.

Finally, the materials classified above as synthetic porcelains have been developed in recent years from synthetic glasses. These porcelains are nevertheless distinguished from the normal glasses, as understood in the proper sense, in that they contain a first high temperature glass particle phase interspersed in a lower temperature glass matrix phase. The second phase refractory glass particles in this multiphase system act similar to crystals in that they increase the viscosity of the overall composition and its ability to retain its premolded shape during vitrification. The second phase also has the thermal and optical compatibility-incompatibility relationships similar to the crystals in mineral base formulations which are needed to achieve translucency, strength, thermal shock resistance, etc.

Also among the porcelains available for dental use are the so-called alumina-base porcelains which provide an abundance of aluminol groups as well as silanols at the surface thereof. This type of porcelain is also derived from a natural mineral-steatite or talc, the latter being essentially a magnesia-alumina-silicate compound. Fusing of this material forms a strong and opaque crystalline porcelain at approximately the same temperature as the feldspathic and nepheline syenite porcelains. As would be expected, the fuse material possesses a suitable and compatible coefficient of thermal expansion.

Such porcelains, although not useful in themselves as esthetic porcelains, may be used advantageously as a structural element in a composite tooth possessing an esthetic, translucent veneer of either feldspathic or nepheline syenite porcelain. Equivalent physical properties also may be achieved by introduction of alumina in other forms, such as crystalline corundum, into a normal feldspathic porcelain.

The resinous insert 4 of FIGURE 2 as stated previously can be the same or similar material as that of the denture base material or any other suitable plastic denture material. Such materials therefore include methyl polymethacrylate, ethyl polymethacrylate, methyl polymethacrylate and mixtures of these and similar resinous materials. In essence, any resinous material having the requisite rigidity for the production of a porcelain tooth insert or core, being compatible and copolymerizable with the denture base material, and possessing a monomer capable of copolymerizing with the reactive silicon-organic chemical coating to produce a strong chemical bond and a strong physical union by diffusion may be employed. It has been found, however, that the methyl polymethacrylate, while suitable for use as the insert or core, becomes quite hard upon curing and some shrinkage occurs which places some stress upon the porcelain portion of the tooth. The higher polymethacrylate materials, such as ethyl, propyl, butyl, etc., which form progressively softer materials, are therefore preferred. Ethyl polymethacrylate, possessing sufficient rigidity to form a very strong insert or core, yet soft enough so as not to produce the stress upon curing associated with methyl polymethacrylate, is the most preferred material.

Numeral 5 of FIGURE 2 represents the chemical bond of porcelain to resin insert or core 4 produced by a coating of the silicon material. Again, it is to be emphasized that the bonding thickness is exaggerated in that a chemical coating of only a few molecules thick is required.

We have found that a synergistic type of property is imparted by the silicon compound used as a bonding agent when the same contains a first functional group reactable with either of the aluminol or silanol groups which lie under an on the surface of the porcelain structure. This bonding agent also contains a functional group which is reactable chemically with the polymeric synthetic resin, usually of the methacrylate type, making up the denture base or the monomer therein. The chemical bonds formed between the bonding agent and the two substrates thus provide a dual effect by creating both conventional adhesion and molecular cementing to unite both substrates permanently.

The bonding agents found and disclosed herein to be suitable in achieving this type of chemical bonding with either the aluminol or silanol groups, or both, or their precursors, aloxane or siloxane, and lying at the surface of the porcelain teeth, contain functional groups which are reactable with the metal hydroxyl groups. These form strong adhesive chemical bonds therewith. Similarly, other and different functional groups are attached directly to the silicon and are chosen so as to be reactable with the particular synthetic resin forming the denture base substrate.

The silicon compounds which may be reacted with the aforementioned substrates are of the generic formula $RSiX_3$, $R_2SiX_2$ and $R_3SiX$ in which X is selected from the halogen, alkoxy and hydroxyl groups, and other groups reactable with silanol, and wherein R is selected from the vinyl, methacrylate, allyl, methallyl, itaconate, maleate, acrylate, aconitate, fumarate, alkyl, aryl, alkenyl, crotonate, cinnamate and citraconate, sorbate and glycidyl groups. Examples of the compounds which may be utilized include the following: vinyl dimethyl chlorosilane, vinyl dimethyl methoxysilane, divinyl chloromethyl silane, vinyl trichlorosilane, vinyl dichloromethyl silane, 3-(trimethoxysilyl)propyl methacrylate or cinnamate, 3-(glycidoxypropyl)trimethoxy silane, bis(glycidoxypropyl) dimethyl disiloxane, trimethoxy vinyl silane, tri(methoxyethoxy)vinyl silane, triethoxyvinyl silane, vinyl silyl triacetate, gamma-methacryloxy propyl trimethoxy silane, trimethoxy allyl silane, diallyl diethoxysilane, allyl triethoxysilane, 3-(methoxydimethyl silyl)propyl allyl fumarate, 3-(chlorodimethyl silyl) propyl methacrylate and either the 3-(trimethoxy silyl)propyl allyl maleate, fumarate, itaconate or sorbate,, vinyl-tris(beta-methoxyethoxy) silane, beta (3,4-epoxycyclohexyl)ethyl triethoxysilane, diphenyl diethoxy silane, amyl triethoxysilane, acrylato-tris(methoxysilane).

Instead of using the simple silane or disiloxane derivatives listed above we may also use appropriately substituted polysiloxanes. Depending on the nature of this polysiloxane the adhesive bond may have some elastomeric character.

In one embodiment of our invention employing an alkoxy alkenyl silane bonding agent, it is preferable that at least one of the substituted groups be a terminal alkenyl radical. Unlike some of the other bonding agents disclosed herein, the alkoxy alkenyl silanes have been found to remain less reactive in anhydrous organic solvents. When this material is used with a stoichiometric amount of water as a cosolvent or coreactant, the interfacial bonding strength is excellent and failure under testing occurs cohesively only within the procelain tooth structure.

The unusual result achieved with the alkoxy silanes is explainable by considering the chemical mechanism accompanying the total reaction. Intermediate to the final reaction, the water hydrolyzes the alkoxy group and removes same from the silane to replace it with an hydroxyl group. This modified intermediate bonding agent, containing an hydroxyl group and taking on the form of a silanol, is reactable directly with the other silanol group lying at the surface of the substrate. The water may also react with siloxane groups on the surface of the porcelain and convert them to more principally reactive silanol forms. It has been found, however, that a suitable bonding will result on a dry surface also.

Although we have thus far indicated that only the silanes which are monofunctional for the porcelain surface are suitable, it is obvious that the number of groups on the silane which are reactable with the porcelain may be one, two or three in number. The spirit of our invention is in no way changed when, for example, a bonding agent comprising vinyl trichlorosilane, vinyl dichloromethyl silane or vinyl dimethyl chlorosilane is used. We may, similarly, use a mono, di or trialkoxy alkenyl silane. The use of a silane having multiple functionality, such as vinyl trichlorosilane, or an acrylate trialkoxysilane, serves ostensibly to increase the number of covalent bonds between the silane and the porcelain surface and hence increases the overall interfacial adhesion therebetween.

We have found in most cases that silanes which react with porcelain to form a single covalent bond establish, however, sufficient adhesive or bonding strength and that under test conditions failure occurs within the porcelain tooth structure, rather than with respect to such bond. When stronger porcelains are developed, the advantages of the multifunctional substituted silanes will obviously be enhanced.

Notwithstanding the particular type of synthetic resin forming the denture base, a functional group which is reactable therewith is selected to form a part of the bonding agent. It is theorized that the type of chemical bond formed between the bonding agent and substrates is of the covalent variety formed by condensation copolymerization, graft polymerization, chain transfer or there may yet be other and different modes of covalent attachment. Ionic bonding, Van Der Wahl bonding and hydrogen bonding may also contribute to the character of our adhesive joints.

The compound 3-glycidoxypropyl trimethoxysilane is exemplary of the variety and types of reactive groups which will polymerize onto and with the methacrylate resin matrix which forms the denture base. Although the bond strength obtained when using this particular compound is very good, the mechanism involved in the reaction between the substrates remains somewhat of a mystery. Such is particularly the case as between the oxirane group and the ensuing free radical reaction which apparently results in the formation of an actual polymeric change between the reactants.

Although the exact type of reactive mechanism and the kinetics of the epoxy group with other growing polymers is not yet clear, we have found epoxy silanes particularly satisfactory with many of the other synthetic resins which may be used for the denture base. More specifically, when an epoxy compound was used instead of the methacrylate monomer and polymer for the denture base, we found that an epoxy silane bonded very readily to this new denture base and gave a strong bond which did not exhibit cohesive failure under acceptable test conditions. It is, therefore, obvious that the oxirane group can readily react with other oxirane groups such as found in epoxy resin precursors. We have also advantageously used unsaturated epoxy monomers such as glycidyl methacrylate as partial replacement for the methyl methacrylate monomer. We may also incorporate the glycidyl methacrylate into the polymer by copolymerization. In each case the epoxy containing polymer was found to be an integral part of the finished composition.

In FIGURE 3, the numerals 2 and 3 represent the same material as in the structure shown in FIGURE 2. Numeral 6 of the FIGURE 3 represents an inner core of a reinforcing strong porcelain. This buttressing strong porcelain 6 is such that it contains alumina either from crystalline inclusion of corundum ($Al_2O_3$) or alumina from other sources, such as steatite or talc (or magnesia-alumina silicate) in concentrations of approximately 25% by weight. These porcelains are extremely opaque and normally cannot be used for artificial teeth which have an esthetic requirement for translucency and even near-transparency in certain areas. As an insert or inner shell in a conventional esthetic porcelain shell, however, such porcelains produce extremely strong artificial tooth products.

Although FIGURE 3 illustrates one proposed shape for the strong porcelain insert, it is to be recognized that proportionately shorter or longer inserts of strong porcelain may be preferable in certain forms which are especially strong or weak and need reinforcement against leverage in lesser or greater amounts.

Numeral 5 of FIGURE 3 again represents the chemical bond. Here the chemical bonding agent is coated on the ridge lap surface of the porcelain composite tooth and bonds such tooth to the resinous denture base material with unusual and unexpected strength. The materials suitable as the chemical bonding agent are the same as those shown enumerated in the discussion of FIG. 2.

In FIGURE 4, the outer esthetic porcelain shell 3 and denture base material 2 are the same as set forth in the discussion of FIGURES 2 and 3. In this embodiment, a reinforcing strong porcelain inner shell 6 and resinous insert or core 4 compose the interior portion of the composite tooth. The materials suitable for employment for the inner shell 6 and core 4 are the same as set forth for the corresponding numerals in FIGURES 3 and 2 respectively. The chemical bond 5 of this embodiment securely bonds the inner shell or porcelain 6 and any of the outer shell 3 which may be in contact with the resinous core 4 to the resinous insert or core 4. Again, the chemical bonding agents suitable for use are the same as those enumerated in the discussion of FIGURE 2 above.

Although the artificial teeth of FIGS. 2–4 have been shown as those which contain a single core structure, an undercut or diatoric core structure can be employed to enhance the physical connection and supplement the chemical union. Such undercut tooth structures are within the scope of the present invention.

Also, the esthetic porcelain shell of FIGURES 2–4 need not be a single mass of porcelain material but can advantageously be composed of at least two layers or different tooth body portions, etc., of varying ceramic compositions.

The following examples illustrate the preparation of the embodiments of the present invention:

*Example 1.*—A conventional multipart metal mold is used wherein one portion of the mold forms the labial or buccal aspect of the tooth, a second portion forms the lingual portion of the tooth, a third mold part (interdigitating with the first mold part) shapes the blend or the relative placement of the material which is colored to simulate natural tooth enamel, and a fourth mold part operates separately or as an adjunct to the second or back mold part in providing a recess or anchorage-abetting area in the ridge, gingival or lingual portions of the tooth.

First, an enamel veneer is molded between the first and third mold parts from a porcelain dough consisting of approximately 97% raw orthoclase feldspar of approximately 200 mesh particle size, 3% of finely ground silica of 400 mesh particle size, gray inorganic pigments such as iron oxide pigments and organic plasticizers and binding agents such as flour paste, Vaseline and starch, with sufficient water to render these materials plastic and easily formed by hand, yet capable of heat-induced hardening to form a biscuit which will withstand reasonable handling prior to vitrification or fusion. This paste is placed in the first mold part, the second mold part is added thereto, the combined mold assembly loaded with the porcelain paste is vibrated to condense the porcelain mixture and then heated under pressure to a temperature substantially above that needed to volatilize the water plasticizer and render the biscuits hard. The mold is then cooled and the third mold part is removed leaving the shaped, hardened enamel veneers in the first mold part. Concurrently, a second porcelain is compounded from approximately 80% raw orthoclase feldspar ground to approximately 200 mesh, and 20% silica ground to finer than 400 mesh. This porcelain is modified with inorganic pigments as needed to simulate the varying shades of natural tooth dentine and also is modified with the same plasticizers, binders and water to render it into a moldable mass. The enamel veneers in the base mold are filled with this dentine-colored porcelain and the mold is completed with the second mold half. This combined mold assembly is reheated to a temperature necessary to volatilize water and harden the composite tooth biscuit.

The porcelain portion of the tooth in biscuit form is thus completed and it is removed from the mold by separately withdrawing the undercut portions formed by the fourth mold part from the second mold part. These preformed, preblended, and preshaded porcelain biscuits are arranged upon refractory trays and are subjected to furnace temperatures and atmospheres necessary to cause sintering, condensation and vitrification. The temperature utilized was approximately 2350° F. for a period of time of at least 15 minutes; the complete firing cycle from beginning to end being approximately 60–90 minutes.[1]

The fused porcelain teeth are next exposed to boiling water for approximately one hour to ensure that silica molecules on the surface have had an opportunity to be hydrolyzed and thus made receptive for silane bonding. Excess water is removed by drying and the appropriate anchorage surfaces of the tooth then are painted with a mixture of 1% trimethoxy silyl propyl methacrylate and 99% hexane, modified with 0.2% acetic acid. The coated tooth is then allowed to air dry for 2 hours and is heated for 5 minutes at 230° F. to ensure complete elimination of the hexane diluent.

Subsequently the anchorage portions of the porcelain tooth which have been coated with silane are filled with ---
[1] This includes the time necessary to gradually raise the temperature and oxidize the organic binders, etc. from the porcelain, apply vacuum or special atmospheres as may be necessary to permit thorough sintering and condensation, completely fuse the mass at the peak temperature and time and finally pass through the cooling cycle slowly enough that the porcelain will not be thermally shocked or cracked.

a methacrylate gel consisting of 67% by weight methyl polymethacrylate and 33% by weight methyl methacrylate monomer and a small portion of a cross-linking monomer to form a crosslinked or network structure. This methacrylate gel is subsequently cured in the tooth anchorage recesses using heat and pressure, techniques well known in the dental industry, to result in a hard, finished mass which is capable of being ground, trimmed or shaped as may be necessary and yet will be susceptible to chemical bonding the plastic monomers in conventional denture base resins.

*Example 2.*—A similar product is prepared as that shown in Example 1 except that a mixture of 1% dimethyl vinyl chlorosilane in 99% hexane is employed as the chemical bonding agent. An extremely strongly bonded artificial tooth composite is produced.

*Example 3.*—A similar product is prepared as that shown in Example 1 except that a 2% hexane solution of vinyl dimethyl silanol acidified by the addition of 0.1% of acetic acid is employed as the chemical bonding agent. Again an extremely strongly bonded artificial tooth composite is produced.

*Example 4.*—The procedure of Example 1 is repeated except that the coated porcelain shell is filled with a methacrylate gel consisting of 67% by weight ethyl polymethacrylate and 33% by weight of ethyl methacrylate monomer. A tooth of superior impact resistance and bond strength is produced.

*Example 5.*—A second embodiment is manufactured as follows: interdigitating mold parts 1 and 3 are used with a porcelain paste composed of 98% orthoclase feldspar fritted in combination with 2% of a highly purified refractory oxide such as alumina ($Al_2O_3$). These two ceramic materials have been previously fritted together and ground to approximately 200 mesh and mixed with plasticizing materials such as flour paste, Vaseline and starch to result in a moldable mass. Following biscuiting of the enamel veneer, a second porcelain is compound of 80% orthoclase feldspar and 20% highly purified aluminum oxide and is fritted to a temperature to cause vitrification and subsequently is ground to approximately 200 mesh. This powder is mixed with appropriate inorganic oxide pigments such zirconium oxide, vanadium oxide yellows, uranium oxide, cerium oxide and iron oxide, and plasticizing and binding agents such as flour paste, Vaseline and starch, and is molded or shaped inside the enamel veneer and between the first mold part and the second. Alternatively, this could take place between the first and fourth mold parts. After heating to cause the biscuits to harden, the mold is separated and the composite tooth biscuits are allowed to remain in the labial portion thereof. A third porcelain mix is compounded with 70% alumina, and 30% orthoclase feldspar fritted, and ground to 200 mesh. This is mixed with the same suitable pigments and plasticizing agents and is molded into the recesses in the composite porcelain tooth with the final lingual shape of the tooth being imparted by a different back mold. After heating to a temperature sufficient to harden the biscuit, the mold is opened, the biscuits removed, fired and the finished porcelain teeth are ready for the treatment with the silane bonding agent.

As before, the vitrified porcelains are exposed to water to complete the hydrolysis of the oxide alumina and silica molecules in the surface, excess water is subsequently removed by drying, and the ridge and anchorage surfaces are painted with a liquid mixture of 2% of a vinyl trichlorosilane in 98% acetone. This surface subsequently is dried by heating under an infra red lamp and the finished tooth is ready for incorporation in a denture. The tooth readily bonds to a copolymerizing monomer in the denture base resin.

*Example 6.*—The process of Example 5 is repeated except that a mixture of 1% trimethoxysilyl propyl methacrylate and 99% hexane, modified with 0.2% acetic acid, is employed as the bonding agent for the porcelain tooth to denture base bond. When such teeth are joined and reacted with the resin base, failure occurs only in the porcelain.

*Example 7.*—The process of Example 5 is again repeated except that a 2% hexane solution of vinyl dimethyl silanol acidified by the addition of 0.1% of acetic acid is employed as the bonding agent. Again, when such teeth are joined and reacted with the denture base, failure occurs only in the porcelain.

*Example 8.*—A mold "sandwich" is used in which the conventional face and back molds are employed with an interlaying mold part which interdigitates with the face mold to shape the enamel-simulating porcelain and with the back mold to shape the pure oxide porcelain which is designed to impart maximum strength.

The enamel-simulating porcelain is a frit containing 92% orthoclase feldspar and 8% silica, fused to vitrification, subsequently ground to 200 mesh and pigmented with inorganic oxides such as zirconium oxide, vanadium oxide yellows, uranium oxide, cerium oxide and iron oxide to impart the grey enamel-simulating color along with plasticizers and binders such as flour paste, Vaseline and starch. The reinforcing porcelain is a frit of 65% alumina, 10% silica and 25% feldspar fused to vitrification, ground to 200 mesh and mixed with the same plasticizers and binders. The enamel-colored material is placed in the front mold portion; the high purity crystalline oxide porcelain in the rear mold half. A special shader mold with accurately shaped interfaces is interlaid between the face and back mold halves and imparts the desired inner contours to the two porcelains being molded and biscuited simultaneously. After the biscuits are hardened, the mold is cooled and the shader element removed from between the enamel-colored porcelain in the face mold and the reinforcing porcelain in the back mold. The intermediate space previously occupied by the shader mold is then filled with a dentine colored porcelain consisting of approximately 65% orthoclase feldspar and 35% silica fritted and ground to 200 mesh. Following biscuiting, the composite porcelain biscuit is removed from the mold and subjected to the conventional fusion processes. At this point the finished porcelain shape still contains some lingual or gingival recesses which would help to impart desirable anchorage mechanics to the tooth. As a final step in manufacture, the vitrified porcelain tooth is exposed to boiling water sufficient to hydrolize the silica and alumina molecules on its surface and following drying the recesses are filled with an ethyl polymethacrylate plastic containing trimethoxysilyl propyl methacrylate in the monomer phase to selectively attach to the hydrolyzed molecules in the porcelain surface and form a permanent chemical bond therewith.

*Example 9.*—When the procedure of Example 8 is repeated using dimethyl dichlorosilane as the bonding agent a similar strongly bonded composite tooth results.

*Example 10.*—When the procedure of Example 8 is again repeated utilizing auto-polymerizing ethyl methacrylate containing tertiary amine accelerators to initiate exothermic polymerization, a strongly bonded dental product is prepared without externally applied heat or pressure.

While certain desirable embodiments of the invention haev been illustrated by way of example, it is to be understood that the invention is not limited to these embodiments but is to be regarded as broadly as any and all equivalent structures and compositions.

We claim:

1. An artificial porcelain tooth structure comprising an outer shell of esthetic porcelain and an inner core of a synthetic resin, said synthetic resin inner core and porcelain shell being chemically and strongly bonded along their interface by a polymerizable organic silicon compound.

2. An artificial porcelain tooth structure comprising an outer shell of esthetic porcelain and an inner core of a synthetic methacrylate-type resin, said methacrylate-type resin core and porcelain shell being chemically and strongly bonded along their interface by a polymerizable organic silicon compound.

3. The artificial tooth of claim 2 wherein the synthetic methacrylate-type resin is selected from the group consisting of polymerized methyl, ethyl, propyl and butyl methacrylates and auto-cured derivatives thereof.

4. The artificial tooth of claim 3 wherein the synthetic methacrylate type resin is polymerized methyl methacrylate.

5. The artificial tooth structure of claim 3 wherein the synthetic methacrylate-type resin is polymerized ethyl methacrylate.

6. The artificial tooth structure of claim 2 wherein the polymerizable organic silicon compound is selected from the group consisting of compounds of the formulae $RSiX_3$, $R_2SiX_2$ and $R_3SiX$ where R is a radical selected from the group consisting of vinyl, methacrylate, allyl, methallyl, itaconate, maleate, acrylate, aconitate, fumarate, alkyl, aryl, alkenyl, crotonate, cinnamate, citraconate, sorbate and glycidyl groups and X is selected from the group consisting of halogen, alkoxy and hydroxy groups.

7. The artificial tooth structure of claim 6 wherein the polymerizable organic silicon compound is trimethoxysilyl propyl methacrylate.

8. The artificial tooth structure of claim 6 wherein the polymerizable organic silicon compound is dimethyl vinyl chlorosilane.

9. The artificial tooth structure of claim 6 wherein the polymerizable organic silicon compound is vinyl dimethyl silanol.

10. An artificial tooth structure comprising an outer shell of esthetic porcelain and an inner core of reinforcing strong porcelain, the ridge lap surface of said porcelains of said artificial tooth having coated thereon means for chemically and strongly bonding said tooth to a synthetic resin denture base material, said means consisting essentially of a polymerizable organic silicon compound.

11. An artificial porcelain tooth of claim 10 wherein the shell of esthetic porcelain comprises at least two different porcelain compositions.

12. The artificial tooth of claim 10 wherein the reinforcing strong porcelain is a porcelain which contains alumina in a concentration of approximately 25% by weight.

13. The artificial tooth of claim 12 in which the polymerizable organic silicon compound is selected from the group consisting of compounds of the formulae $RSiX_3$, $R_2SiX_2$, and $R_3SiX$ where R is a radical selected from the group consisting of vinyl methacrylate, allyl, methallyl, itaconate, maleate, acrylate, aconitate, fumarate, alkyl, aryl, alkenyl, crotonate, cinnamate, citraconate, sorbate and glycidyl groups and X is selected from the group consisting of halogen, alkoxy, and hydroxy groups.

14. The artificial tooth of claim 13 wherein the polymerizable organic silicon compound is vinyl trichlorosilane.

15. The artificial tooth of claim 13 wherein the polymerizable organic silicon compound is trimethoxysilyl propyl methacrylate.

16. The artificial tooth of claim 13 wherein the polymerizable organic silicon compound is vinyl dimethyl silonal.

17. An artificial porcelain tooth product comprising an outer shell of esthetic porcelain, an inner shell of reinforcing strong porcelain and a core of a synthetic resin, said synthetic resin core and inner porcelain shell being chemically and strongly bonded along their area of contact by a polymerizable organic silicon compound.

18. An artificial porcelain tooth of claim 17 wherein the shell of esthetic porcelain comprises at least two different porcelain compositions.

19. The artificial tooth of claim 17 wherein the reinforcing strong porcelain is a porcelain which contains alumina in a concentration of approximately 25% by weight.

20. The artificial tooth of claim 19 wherein the synthetic resin is selected from the group consisting of polymerized methyl, ethyl, propyl, and butyl methacrylates and auto-cured derivatives thereof.

21. The artificial tooth of claim 20 wherein the synthetic resin is polymerized methyl methacrylate.

22. The artificial tooth of claim 20 wherein the synthetic resin is polymerized ethyl methacrylate.

23. The artificial tooth of claim 19 wherein the polymerizable organic silicon compound is selected from the group consisting of compounds of the formula $RSiX_3$, $R_2SiX_2$, and $R_3SiX$ wherein R is a radical selected from the group consisting of vinyl, methacrylate, allyl, methallyl, itaconate, maleate, acrylate, aconitate, fumarate, alkyl, aryl, alkenyl, crotonate, cinnamate, citraconate, sorbate and glycidyl groups and X is selected from the group consisting of halogen, alkoxy, and hydroxy groups.

24. The artificial tooth of claim 23 wherein the polymerizable organic silicon compound is trimethoxysilyl propyl methacrylate.

25. The artificial tooth of claim 23 wherein the polymerizable organic silicon compound is dimethyl dichlorosilane.

References Cited

UNITED STATES PATENTS

| | | | |
|---|---|---|---|
| 2,302,375 | 11/1942 | Myerson | 32—8 X |
| 2,380,468 | 7/1945 | Saffir | 32—8 |
| 2,419,084 | 4/1947 | Myerson et al. | 32—8 |
| 2,611,958 | 9/1952 | Semmelman et al. | 32—8 |
| 3,052,583 | 9/1962 | Carlstrom et al. | 161—206 X |
| 3,288,893 | 11/1966 | Stebleton | 161—208 X |

F. BARRY SHAY, *Primary Examiner.*

U.S. Cl. X.R.

260—448.2; 264—20, 18; 161—208; 156—329; 106—35